United States Patent
Ikeda et al.

(10) Patent No.: US 8,603,661 B2
(45) Date of Patent: Dec. 10, 2013

(54) BATTERY CONNECTION PLATE

(75) Inventors: Tomohiro Ikeda, Makinohara (JP);
Katsunori Sato, Makinohara (JP);
Hiroyuki Kato, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/496,991

(22) PCT Filed: Apr. 19, 2011

(86) PCT No.: PCT/JP2011/059618
§ 371 (c)(1),
(2), (4) Date: Mar. 19, 2012

(87) PCT Pub. No.: WO2011/132671
PCT Pub. Date: Oct. 27, 2011

(65) Prior Publication Data
US 2012/0183833 A1 Jul. 19, 2012

(30) Foreign Application Priority Data

Apr. 22, 2010 (JP) ................................. 2010-099197

(51) Int. Cl.
*H01M 2/26* (2006.01)
*H01M 6/42* (2006.01)

(52) U.S. Cl.
USPC .......................................... 429/121; 429/159

(58) Field of Classification Search
None
See application file for complete search history.

(56) References Cited

U.S. PATENT DOCUMENTS

| | | | |
|---|---|---|---|
| 6,240,637 B1 * | 6/2001 | Ikeda et al. | 29/854 |
| 6,261,719 B1 * | 7/2001 | Ikeda et al. | 429/211 |
| 6,290,552 B1 | 9/2001 | Saito et al. | |
| 6,390,858 B2 | 5/2002 | Saito et al. | |
| 6,428,364 B2 | 8/2002 | Saito et al. | |
| 6,431,921 B2 | 8/2002 | Saito et al. | |
| 2010/0055993 A1 | 3/2010 | Ikeda et al. | |

FOREIGN PATENT DOCUMENTS

| | | | |
|---|---|---|---|
| JP | 2000149909 A | | 5/2000 |
| JP | 2000333343 A | | 11/2000 |
| JP | 2003242950 A | | 8/2003 |
| JP | 201055885 A | | 3/2010 |
| JP | 2010-114025 | * | 5/2010 |
| JP | 2010170884 A | | 8/2010 |
| JP | 201118478 A | | 1/2011 |

OTHER PUBLICATIONS

International Search Report (PCT/ISA/210) issued on Jun. 7, 2011 in the International Patent Application No. PCT/JP2011/059618.
Written Opinion (PCT/ISA/237) issued on Jun. 7, 2011 in the International Patent Application No. PCT/JP2011/059618.

* cited by examiner

*Primary Examiner* — Ula C Ruddock
*Assistant Examiner* — Matthew Van Oudenaren
(74) *Attorney, Agent, or Firm* — Sughrue Mion, PLLC

(57) ABSTRACT

A battery connection plate has a plurality of bus bars provided on a base plate section and is to be attached to a battery assembly containing a stacked plurality of batteries so that the bus bars are connected to terminals on the batteries. The base plate section has a wiring member attachment section to which a plurality of signal output wires connected to the bus bars can be wired, and window sections through which bosses can be inserted are formed on wiring paths of the signal output wires at the wiring member attachment section. The signal output wires are wired so as to bypass or wind around the bosses inserted into the window sections, and then the bosses are pulled out from the window sections, and thereby surplus length sections are formed on the signal output wires.

5 Claims, 7 Drawing Sheets

FIG.8
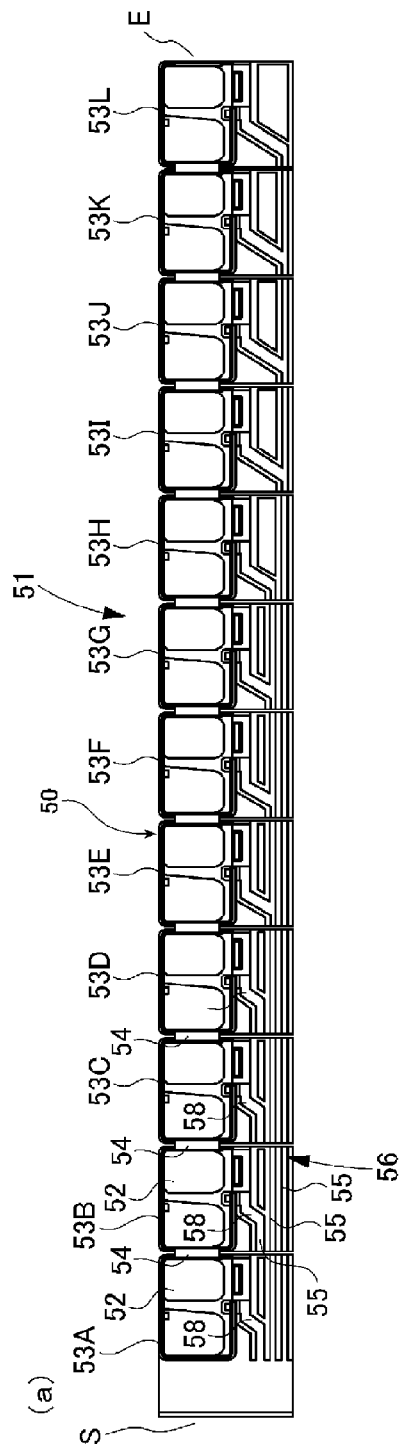
(a)
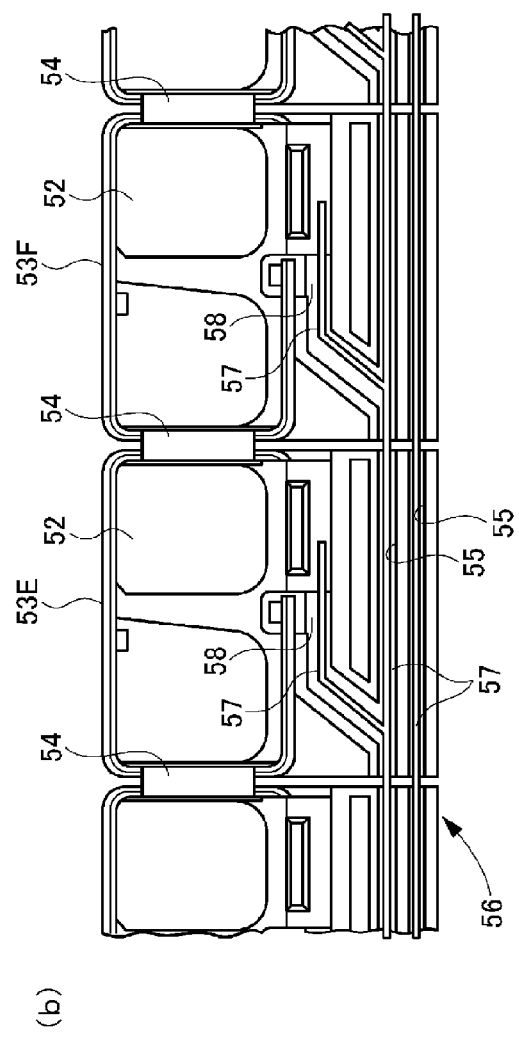
(b)

BATTERY CONNECTION PLATE

TECHNICAL FIELD

The present invention relates to a battery connection plate which is to be attached to a battery mounted on a vehicle such as an electric vehicle, a hybrid car or the like.

BACKGROUND ART

As eco-friendly vehicles, electric vehicles or hybrid cars are increasing.

Such a vehicle includes, mounted therein, a power source constituted by a battery assembly containing a stacked plurality of batteries.

That kind of power supply device contains a battery assembly configured such that batteries each having a positive electrode at one end and a negative electrode at the other end are alternately reversely coupled to one another. The power supply device further contains a battery connection plate configured such that a bus bar having two holes into which electrodes of adjacent batteries are inserted is provided on a base plate section made of a synthetic resin so as to form a connection section with respect to the batteries in order to serially connect the batteries.

As battery connection plates like the above, there is one in which a flexible section is formed, by each of a predetermined number of connection sections, on a slit provided on a base plate section with an escape hole therebetween in order to adjust positional deviation between an electrode and a hole of a bus bar, a base plate section is divided by a slit and both sides of each base plate section are coupled by a pair of hinge-like flexible sections, or pitch adjusting unit configured such that a base plate section is divided by each connection section and the connection sections are mutually coupled by a hinge-like flexible section, is provided (see, for example, Patent Document 1).

Prior Art Documents

Patent Documents

Patent Document 1: JP-A-2000-149909

SUMMARY OF INVENTION

Problems that the Invention is to Solve

In the above described power supply device, signal output wires which are connected respective bus bars and are adapted to output respective voltages of batteries, are provided in order to detect the voltages of the respective batteries, and the signal output wires are introduced into a control device.

The signal output wires are, for example, accommodated and wired in a wiring groove formed on a base plate section of a battery connection plate. However, in this case, positional deviation of a terminal of the battery is not absorbed as a battery connection plate having pitch adjusting unit.

Particularly, since the positional deviation is accumulated from an assembling start end of the batteries toward an assembling finish end thereof, the deviation becomes large at the assembling finish end. As a result, there is a possibility that a large tensile force is applied to the signal output wires connected thereto or connection of the signal output wires becomes difficult.

The invention is made in view of the above circumstances, and the purpose of the invention is to provide a battery connection plate that can prevent influence to a signal output wire due to deviation of a connection position so as to maintain a good wiring condition.

Means for solving the Problems

The purpose of the invention is achieved by configurations (1) and (2) described below.

(1) A battery connection plate has a plurality of bus bars provided on a base plate section and is to be attached to a battery assembly containing a stacked plurality of batteries so that the bus bars are connected to terminals on the batteries. The base plate section has a wiring member attachment section to which a plurality of signal output wires connected to the bus bars can be wired, and window sections through which bosses can be inserted are formed on wiring paths of the signal output wires at the wiring member attachment section. The signal output wires are wired so as to bypass or wind around the bosses inserted into the window sections, and then the bosses are pulled out from the window sections, and thereby surplus length sections are formed on the signal output wires.

In accordance with the battery connection plate having the configuration described in the item (1), by the configuration that the signal output wires are wired so as to bypass or wind around the bosses inserted into the window sections and the bosses are pulled out from the window sections, it is possible to extremely readily form the surplus length sections on the signal output wires.

In the case where the surplus length sections are formed on the signal output wires as in the above, even when deviation occurs on a connection position of the signal output wire to the bus bar due to a dimensional tolerance of a terminal of the battery in the event of attaching the battery connection plate to the battery assembly, the deviation can be surely absorbed by the surplus length section.

With this, it is possible to eliminate such a trouble that a large tensile force is applied to the signal output wire due to deviation of the connection position or the signal output wire is not connected at the connection position with the bus bar.

That is, influence to the signal output wire due to deviation of the connection position is suppressed as much as possible so that it is possible to maintain a good wiring condition with high reliability.

(2) In the battery connection plate having the configuration described in the item (1), the wiring member attachment section has a wiring space for the signal output wires to be wired from an end portion of an assembling start end of the batteries to a connection position with the bus bar. A region of the wiring space is gradually reduced in accordance with the decrease of the number of the signal output wires toward an assembling finish end of the batteries. Each of the window sections is formed in a range including a region where the signal output wires are not wired for the wiring space is gradually reduced toward the assembling finish end so that the sizes of the window sections are gradually increased.

In accordance with the battery connection plate having the configuration described in the item (2), since each of the window sections into which the boss is inserted is formed in the range including the region where signal output wires are not wired because the wiring space is gradually reduced toward the assembling finish end so that the sizes of the window sections are gradually increased, the thicknesses of the bosses which are to be inserted into the window sections can be also increased. Accordingly, the lengths of the surplus length sections formed by the bosses can be gradually increased from the assembling start end toward the assembling finish end.

Here, while the deviation of the connection position is gradually and cumulatively increased from the assembling start end toward the assembling finish end of the batteries, the lengths of the surplus length sections can be gradually increased from the assembling start end toward the assembling finish end as described in the above. As a result, it is possible to surely absorb the deviation by using the surplus length sections irrespective of the assembling positions.

In addition, the region where signal output wires are not wired because the wiring space is reduced toward the assembling finish end, can be efficiently used so that it is possible to provide the battery connection plate that can be adequately adaptable to the positional deviation without raising the cost.

BRIEF DESCRIPTION OF THE DRAWINGS

FIG. 1 is a perspective view showing a battery connection plate and a battery assembly according to an embodiment of the invention.

FIG. 2(a) is a plan view showing an entirety of the battery connection plate according to the embodiment of the invention, and FIG. 2(b) is a plan view showing a part of the battery connection plate shown in FIG. 2(a).

FIG. 3 is a perspective view showing the battery connection plate and a jig for wiring.

FIG. 4 is a perspective view showing the battery connection plate placed on the jig for wiring.

FIG. 5 is a plan view explanatorily showing a way of wiring signal output wires on the battery connection plate.

FIG. 6 is a plan view explanatorily showing another way of wiring the signal output wires on the battery connection plate.

FIG. 7 is a plan view showing a part of the battery connection plate on which the signal output wires are wired.

[FIG. 8] FIG. 8(a) is a plan view showing an entirety of a battery connection plate according to a reference example, and FIG. 8(b) is a plan view showing a part of the battery connection plate according to the reference example shown in FIG. 8(a).

MODE FOR CARRYING OUT THE INVENTION

A preferable embodiment of the invention will be described below with reference to accompanying drawings.

Figure 1:
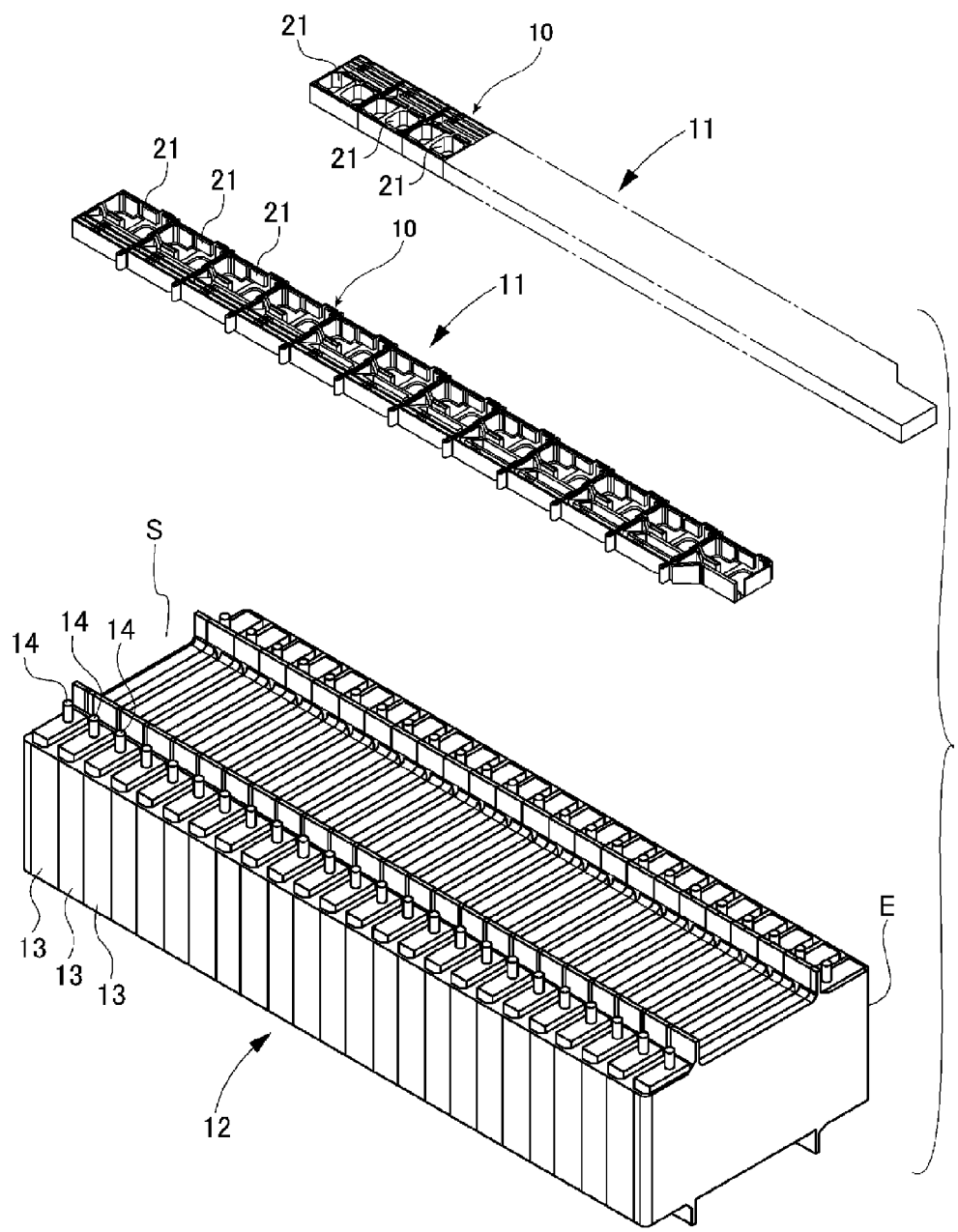
[FIG. 1]

As shown in FIG. 1, a battery connection plate 11 is attached to a battery assembly 12. The battery assembly 12 is configured such that a plurality of rectangular shaped batteries 13 are assembled so as to be coupled to one another from an assembling start end S toward an assembling finish end E. In the battery assembly 12, terminals 14 of the batteries 13 are arranged at both side sections on a top face, and the battery connection plate 11 is attached to each of the arrangement portions of the terminals 14.

Each of the battery connection plates 11 according to the embodiment has a plurality of bus bar attachment sections 21 provided on a base section 10 formed of a synthetic resin and bus bars 20 (shown by a chain double-dashed line in FIG. 2(b)) formed of metal plates are fitted to the bus bar attachment sections 21. A pair of connection holes 20a are formed on each of the bus bars 20. The terminals 14 of the plurality of batteries 13 which are coupled to one another and arranged, are inserted into the respective connection holes 20a. By fastening nuts (not shown) to the terminals 14 of the batteries 13, the terminals 14 are connected to the bus bars 20 of the respective battery connection plates 11 to be conducted thereto.

As shown in FIG. 2(a) and FIG. 2(b), the base plate section 10 of each of the battery connection plates 11 is divided into a plurality of division units 22A to 22L in the longitudinal direction. The bus bar attachment sections 21 to which the bus bars 20 are respectively fitted are formed on the respective division units 22A to 22L.

In the division units 22A to 22L, the adjacent division units are coupled by a pair of hinge sections 24. Each of the hinge sections 24 is bent to have a U-shape. Therefore, when the hinge section 24 is elastically deformed, the adjacent division units in the division units 22A to 22L can be contacted with or separated from each other. That is, the battery connection plate 11 has pitch adjusting unit constituted by the hinge sections 24. Positional deviation of the terminal of the battery 13 is to be absorbed by the hinge section 24.

In addition, the base plate section 10 of the battery connection plate 11 is provided with a wiring member attachment section 31 in parallel to arrangement of the bus bar attachment sections 21. A plurality of signal output wires 32 for detecting voltages of the batteries 13 are attached to the wiring member attachment section 31. The signal output wires 32 are extended to the respective division units 22A to 22L to be connected to the bus bars 20 which are attached to the respective bus bar attachment sections 21 of the division units 22A to 22L. The signal output wires 32 are to be connected to a control device (not shown) and are wired to the wiring member attachment section 31 from the assembling start end S of the battery connection plate 11 so as to be introduced to connection positions with the respective bus bars 20.

The wiring member attachment section 31 has a plurality of signal wire housing grooves (wiring spaces) 33a, 33b and 33c in which the signal output wires 32 are accommodated. The signal wire housing groove 33a is formed over the division units 22A to 22C, the signal wire housing groove 33b is formed over the division units 22A to 22G, and the signal wire housing groove 33c is formed over the division units 22A to 22K. In addition, branch wire paths 34 communicating with the connection positions to the respective bus bars 20 are formed on the respective division units 22A to 22L.

Thus, in the wiring member attachment section 31 of the battery connection plate 11, a region of the wiring space formed of the signal wire housing grooves 33a, 33b and 33c is gradually reduced toward the assembly finish end E of the batteries 13 as the wiring number of signal output wires 32 is decreased.

Three signal output wires 32 are accommodated in the signal wire housing groove 33a so as to be vertically laminated. The signal output wires 32 are introduced to the branch wire paths 34 of the division units 22B to 22C and are connected to the bus bars 20 attached to the respective bus bar attachment sections 21 of the division units 22B to 22C.

Four signal output wires 32 are accommodated in the signal wire housing groove 33b so as to be vertically laminated. The signal output wires 32 are introduced to the branch wire paths 34 of the division units 22D to 22G and are connected to the bus bars 20 attached to the respective bus bar attachment sections 21 of the division units 22D to 22G.

Five signal output wires 32 are accommodated in the signal wire housing groove 33c so as to be vertically laminated. The signal output wires 32 are introduced to the branch wire paths 34 of the division units 22H to 22L and are connected to the bus bars 20 attached to the respective bus bar attachment sections 21 of the division units 22H to 22L.

Meanwhile, one signal output wire 32 is directly introduced to the branch wire path 34 of the division unit 22A and the signal output wire 32 is connected to the bus bar 20 attached to the bus bar attachment section 21 of the division unit 22A.

Surplus length housing sections 35 are respectively formed on wiring paths between the signal wire housing groove 33*a* and the branch wire paths 34 of the division units 22B to 22C, wiring paths between the signal wire housing groove 33*b* and the branch wire paths 34 of the division units 22D to 22G, and wiring paths between the signal wire housing groove 33*c* and the branch wire paths 34 of the division units 22H to 22L. A surplus length section 32*a* in which the signal output wires 32 introduced to the respective branch wire paths 34 are slackened, is accommodated in each of the surplus length housing sections 35.

A window section 36*a* that passes through from a front side to a rear side and has a triangle shape in a plan view is formed on each of the surplus length housing sections 35 provided in the wiring paths of the division units 22B to 22C. A window section 36*b* that passes through from a front side to a rear side and has a triangle shape in a plan view is formed on each of the surplus length housing sections 35 of the division units 22D to 22G. In addition, a window section 36*c* that passes through from a front side to a rear side and has a triangle shape in a plan view is formed on each of the surplus length housing sections 35 of the division units 22H to 22K. A window section 36*d* that passes through from a front side to a rear side and has a triangle shape in a plan view is formed on the surplus length housing section 35 of the division units 22L. Meanwhile, the window section 36*d* is not limited to be in the triangle shape in the plan view, but can be in a polygonal or circular shape.

The opening area of each of the window sections 36*b* of the division units 22D to 22G arranged at an assembling finish end E side rather than the division units 22B to 22C is made larger than that of each of the window sections 36*a* of the division units 22B to 22C. In addition, the opening area of each of the window sections 36*c* of the division units 22H to 22K arranged at the assembling finish end E side rather than the division units 22D to 22G is made larger than that of each of the window sections 36*b* of the division units 22D to 22G. The opening area of the window section 36*d* of the division unit 22L is made larger that that of each of the window sections 36*c* of the division units 22H to 22K.

Thus, each of the window sections 36*a*, 36*b*, 36*c* and 36*d* is formed in a range including a region where the signal output wires 32 are not wired because the wiring space constituted by the signal wire housing grooves 33*a*, 33*b* and 33*c* is gradually reduced toward the assembling finish end E so that the opening areas of the window sections 36*a*, 36*b*, 36*c* and 36*d* are gradually increased.

Next, described is a case where the signal output wires 32 are wired in the wiring member attachment section 31 of the base plate section 10 in the aforementioned battery connection plate 11.

Figure 3:
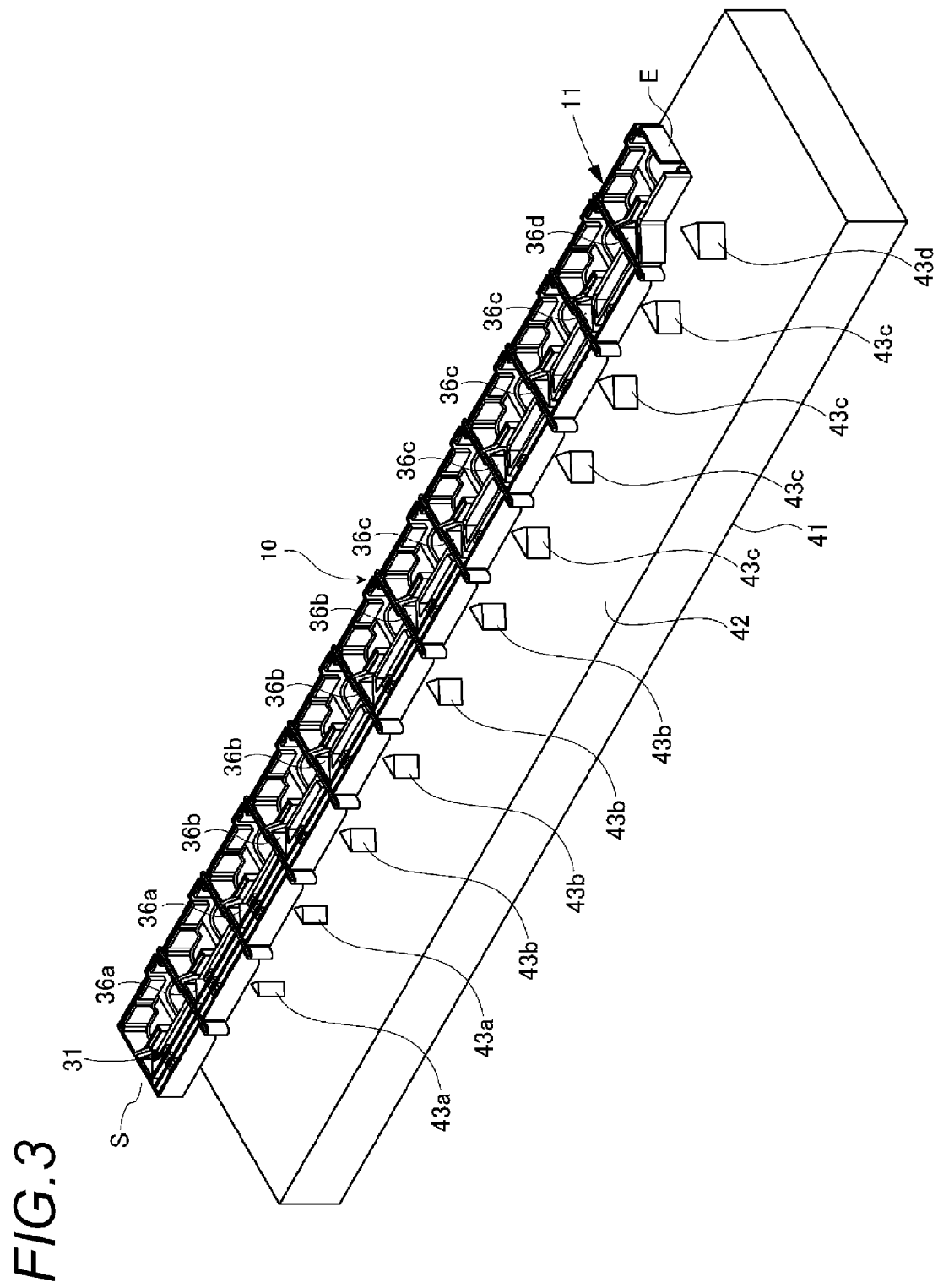
[FIG. 3]

As shown in FIG. 3, when the signal output wires 32 are wired in the wiring member attachment section 31 of the base plate section 10 in the battery connection plate 11, a jig 41 for wiring is used.

The jig 41 for wiring has a placement face 42 on which the base plate section 10 of the battery connection plate 11 is to be placed. The wiring of the signal output wires 32 is carried out under a condition that the battery connection plate 11 is placed on the placement face 42 of the jig 41 for wiring.

Bosses 43*a*, 43*b*, 43*c* and 43*d* each having a triangle shape in a plan view are vertically provided on the placement face 42. The bosses 43*a* are formed at the respective positions corresponding to the window sections 36*a* formed on the surplus length sections 35 of the division units 22B to 22C. The bosses 43*b* are formed at the respective positions corresponding to the window sections 36*b* formed on the surplus length sections 35 of the division units 22D to 22G. The bosses 43*c* are formed at the respective positions corresponding to the window sections 36*c* formed on the surplus length sections 35 of the division units 22H to 22K. Further, the boss 43*d* is formed at the position corresponding to the window section 36*d* formed on the surplus length section 35 of the division unit 22L.

Each of the bosses 43*a* has a cross sectional shape of which the size is slightly smaller than those of the window sections 36*a* formed on the surplus length housing sections 35 of the division units 22B to 22C. Each of the bosses 43*b* has a cross sectional shape of which the size is slightly smaller than those of the window sections 36*b* formed on the surplus length housing sections 35 of the division units 22D to 22G. Each of the bosses 43*c* has a cross sectional shape of which the size is slightly smaller than those of the window sections 36*c* formed on the surplus length housing sections 35 of the division units 22H to 22K. The boss 43*d* has a cross sectional shape of which the size is slightly smaller than that of the window section 36*d* formed the surplus length housing section 35 of the division unit 22L. Accordingly, the bosses 43*a* can be inserted into the respective window sections 36*a* probably without forming gaps, the bosses 43*b* can be inserted into the respective window sections 36*b* probably without forming gaps, and the bosses 43*c* can be inserted into the respective window sections 36*c* probably without forming gaps. Further, the boss 43*d* can be inserted into the respective window section 36*d* probably without forming a gap.

Figure 4:
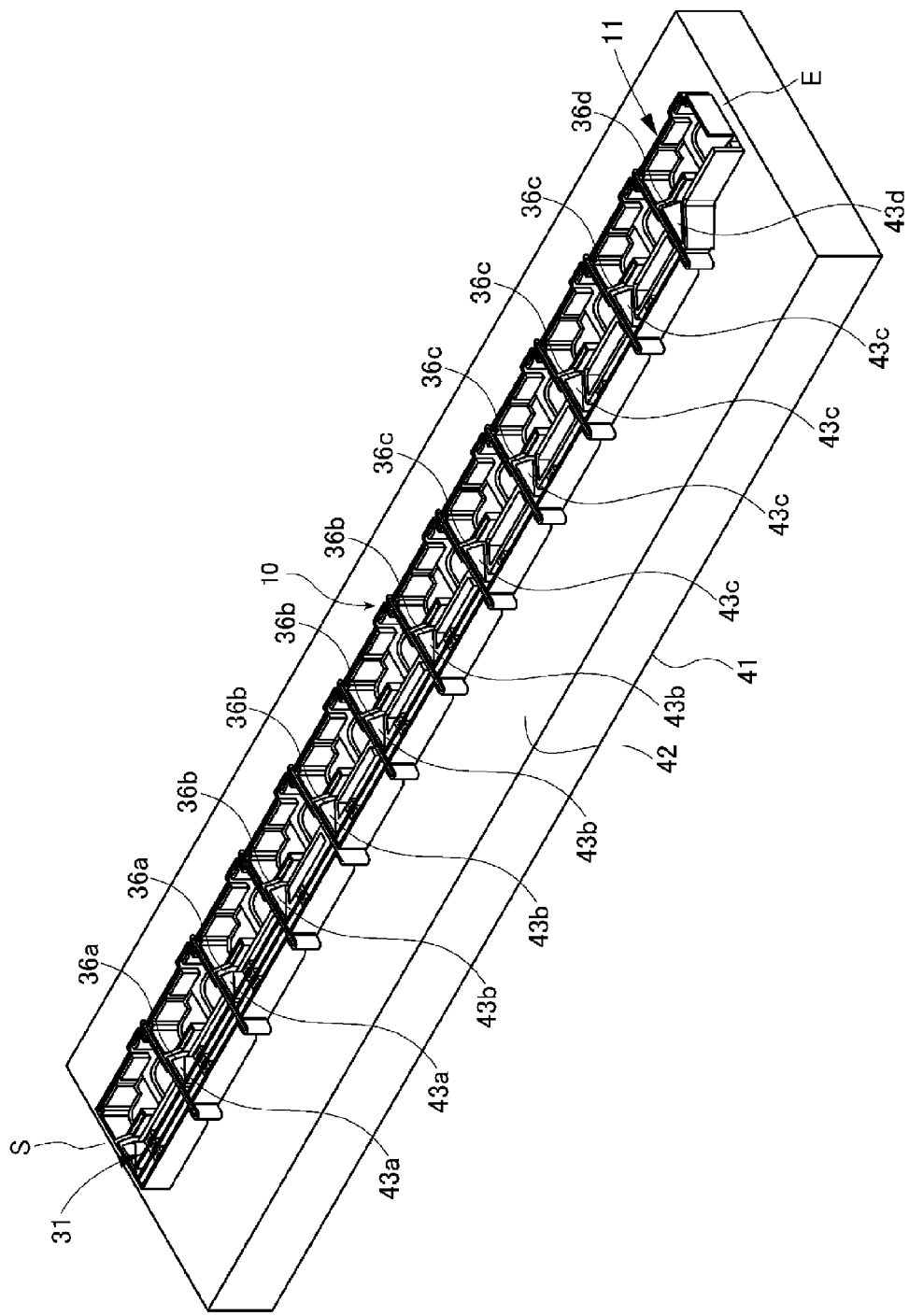
[FIG. 4]

As shown in FIG. 4, the base plate section 10 of the battery connection plate 11 is placed on the placement face 42 with respect to the jig 41 for wiring while the bosses 43*a*, 43*b*, 43*c* and 43*d* of the jig 41 for wiring are inserted into the respective window sections 36*a*, 36*b*, 36*c* and 36*d*.

In accordance with the above configuration, the bosses 43*a*, 43*b*, 43*c* and 43*d* of the jig 41 for wiring are projected upward from the respective window sections 36*a*, 36*b*, 36*c* and 36*d* of the base plate section 10 in the battery connection plate 11.

Consequently, the battery connection plate 11 is positioned on the placement face 42 of the jig 41 for wiring by the bosses 43*a*, 43*b*, 43*c* and 43*d*.

Under the above condition, the signal output wires 32 are wired by being accommodated in the respective signal wire housing grooves 33*a*, 33*b* and 33*c*, and the branch wire paths 34 of the respective division units 22A to 22L.

Figure 5:
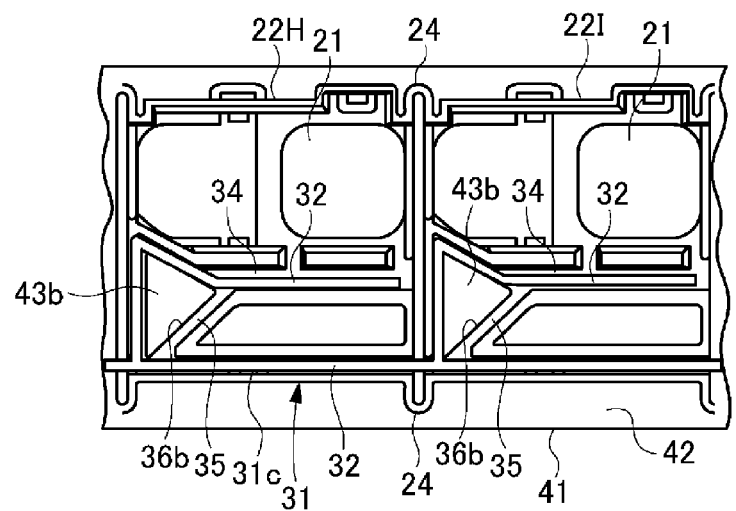
[FIG. 5]

Here, as shown in FIG. 5, when the signal output wires 32 are wired from the signal wire housing grooves 33*a*, 33*b* and 33*c* to the branch wire paths 34, the signal output wires 32 are made to bypass the respective bosses 43*a*, 43*b*, 43*c* and 43*d* to the outsides thereof away from the branch wire paths 34.

After all of the signal output wires 32 are wired as in the above, the base plate section 10 of the battery connection plate 11 is removed from the jig 41 for wiring.

Figure 2:
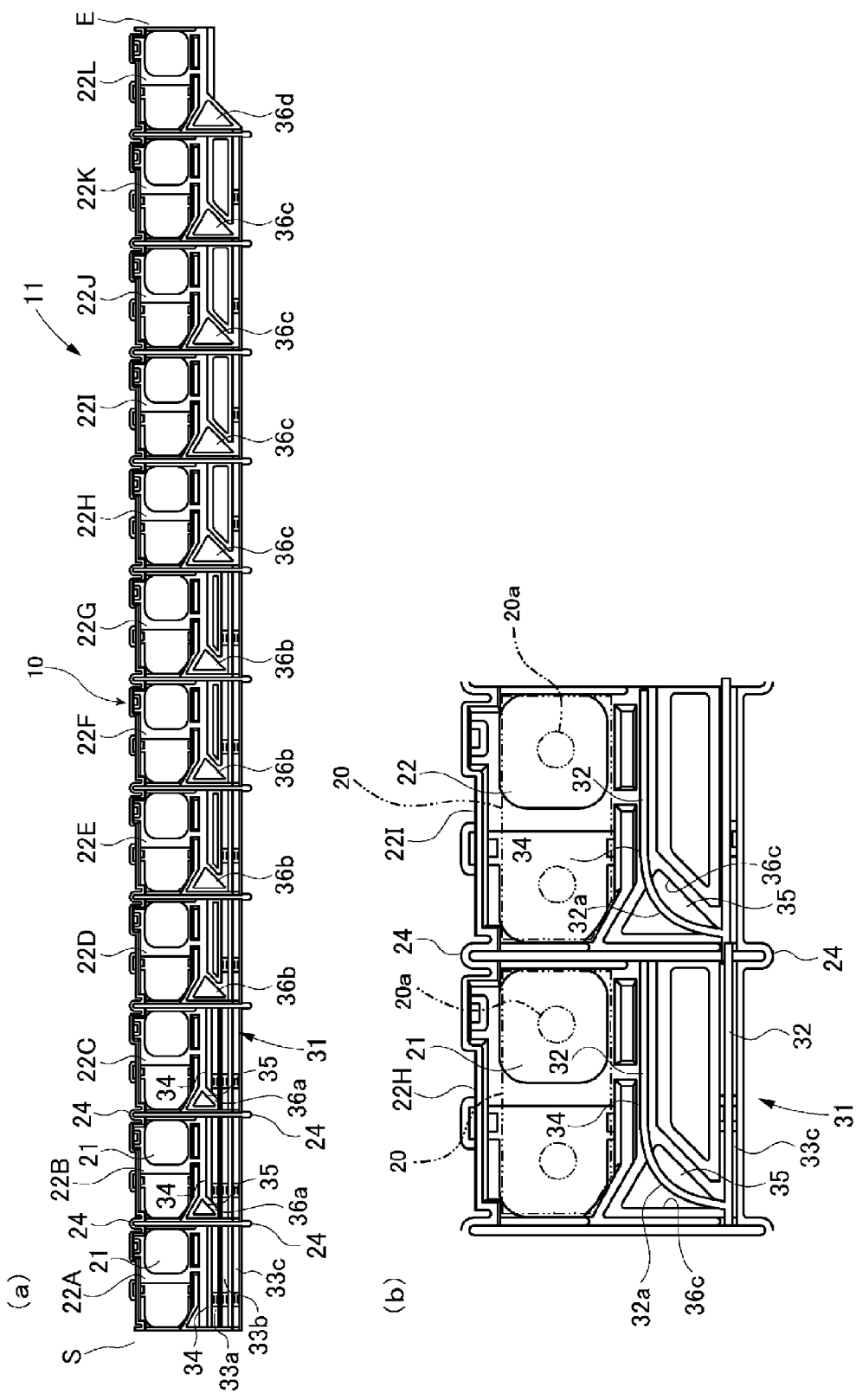
[FIG. 2]

Consequently, in the surplus length housing sections 35 having the window sections 36*a*, 36*b*, 36*c* and 36*d* from which the respective bosses 43*a*, 43*b*, 43*c* and 43*d* are pulled out, the signal wires 32 are slackened by degrees of bypassing the respective bosses 43*a*, 43*b*, 43*c* and 43*d* to the outside thereof so as to form the surplus length sections 32*a* (see FIG. 2(*b*)).

In accordance with the battery connection plate 11 in which the signal output wires 32 are wired in the wiring member attachment sections 31 under a condition that the surplus length sections 32a are formed as described in the above, even when deviation occurs on a connection position of the signal output wires 32 to the bus bar 20 due to a dimensional tolerance of a terminal of the battery in the event of attaching the battery connection plate 11 to the battery assembly 12, the deviation can be surely absorbed by the surplus length section 32a.

In addition, since each of the window sections 36a, 36b, 36c and 36d into which the respective bosses 43a, 43b, 43c and 43d are inserted is formed in the range including the region where signal output wires 32 are not wired because the wiring space is reduced toward the assembling finish end E and the sizes of the window sections 36a, 36b, 36c and 36d are gradually increased, the thicknesses of the bosses 43a, 43b, 43c and 43d which are to be inserted into the respective window sections 36a, 36b, 36c an 36d can be also increased. Accordingly, the lengths of the surplus length sections 32a formed by the respective bosses 43a, 43b, 43c and 43d can be gradually increased from the assembling start end S toward the assembling finish end E.

Here, the deviation in the connection position is gradually and cumulatively increased from the assembling start end S toward the assembling finish end E of the batteries 13. However, since the lengths of the surplus length sections can be gradually increased from the assembling start end S toward the assembling finish end E as described in the above, it is possible to surely absorb the deviation by using the surplus length sections 32a irrespective of the assembling position.

In addition, the region where signal output wires 32 are not wired because the wiring space is reduced toward the assembling finish end E, can be efficiently used so that it is possible to provide the battery connection plate 11 that can be adequately adaptable to the positional deviation without raising the cost.

That is, by using the battery connection plate 11, it is possible to eliminate such a trouble that a large tensile force is applied to the signal output wire 32 due to deviation of the connection position or the signal output wire is not connected at a connection position to the bus bar 20.

Consequently, influence to the signal output wire 32 due to deviation of the connection position is suppressed as much as possible so that it is possible to maintain a good wiring condition with high reliability.

In addition, the base plate section 10 of the battery connection plate 11 is placed on the placement face 42 with respect to the jig 41 for wiring while the bosses 43a, 43b, 43c and 43d of the jig 41 for wiring are inserted into the respective window sections 36a, 36b, 36c and 36d. With this, it is possible to extremely readily hold and position the battery connection plate 11. Accordingly, it is possible to improve workability of wiring the signal output wires 32 to the battery connection plate 11.

Figure 6:
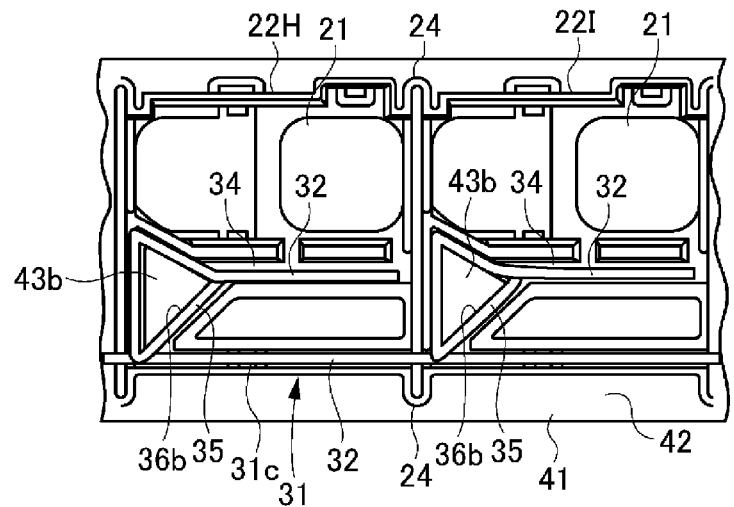
[FIG. 6]
Figure 7:
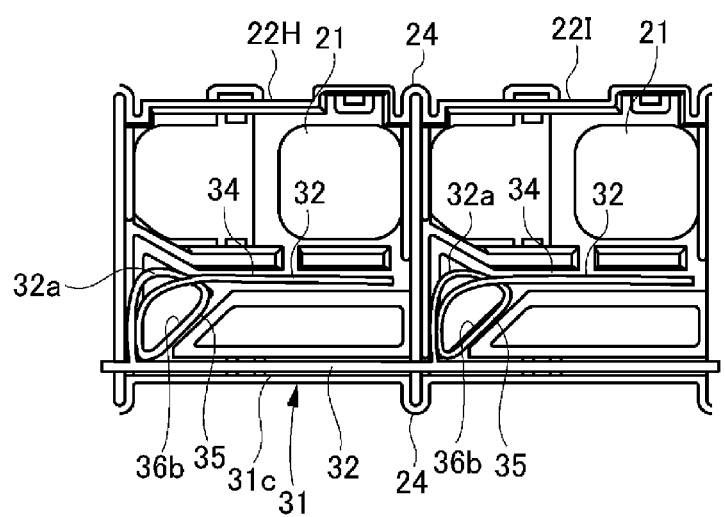
[FIG. 7]

Meanwhile, in the above embodiment, when the signal output wires 32 are wired from the signal wire housing grooves 33a, 33b and 33c on the base plate section 10 to the respective branch wire paths 34, the signal output wires 32 are made to bypass the bosses 43a, 43b, 43c and 43d to the outside thereof with respect to the branch wire paths 34 so as to form the surplus length sections 32a. However, in order to allow each of the signal output wires 32 to have a larger slack at the surplus length section 32a, it is possible to wind the signal output wires 32 around the respective bosses 43a, 43b, 43c and 43d as shown in FIG. 6. With the above configuration, when the battery connection plate 11 is picked up from the jig 41 for wiring as shown in FIG. 7, the surplus length section 3a having a large slack can be formed in the surplus length housing section 35 so that it is possible to make the battery connection plate 11 to be adaptable to larger deviation.

Here, in order to explain a further advantage of the invention, an example is shown in FIGS. 8(*a*) and 8(*b*).

FIG. 8(*a*) is a plan view showing an entirety of a battery connection plate according to the example, and FIG. 8(*b*) is a plan view showing a part of the battery connection plate according to the example shown in FIG. 8(*b*).

As shown in FIGS. 8(*a*) and 8(*b*), in a base plate section 50 on this battery connection plate 51, a plurality of division units 53A to 53L each having a bus bar attachment section 52 are coupled to one another with hinge sections 54. The base plate section 50 of the battery connection plate 51 is provided with a wiring member attachment section 56 having a plurality of signal wire housing grooves 55, and signal output wires 57 are accommodated in the signal wire housing grooves 55 in the wiring member attachment section 56. In addition, a branch wire path 58 that introduces the signal output wires 57 to a connection position with a bus bar (not shown) to be attached to the bus bar attachment section 52 from the signal wire housing groove 55 is formed on each of the division units 53A to 53L. The signal output wires 57 from the respective signal housing groove 55 are accommodated in the respective branch wire path 58 without surplus lengths.

In the battery connection plate 51 as described above, the hinge sections 54 among the division units 53A to 53L are deformed so that deviation of the terminal 14 of the battery 13 can be absorbed. Therefore, the bus bar attached to the bus bar attachment section 52 can be smoothly connected to the terminal 14 of the battery 13.

However, since the signal output wire 57 in this battery connection plate 51 does not have a surplus length section, positional deviation of the terminal 14 of the battery 13 could not be absorbed. Particularly, at the assembling finish end E of the batteries 13 where the deviation is accumulated and increased, there is a possibility that a large tensile force is applied to the connected signal output wire 57 or connection of the signal output wire 57 becomes difficult.

Meanwhile, the invention is not limited to the above embodiment, but changes, modifications or the like can be made if necessary. That is, various changes can be made without departing from the essence of the invention. In addition, a material, a shape, a dimension, a number, a placement position and the like of each of the components of the above described embodiment are arbitrary and are not limited thereto as long as the invention can be achieved.

This application is based on Japanese Patent Application (JP-2010-099197) filed on Apr. 22, 2010, the contents of which are incorporated herein by reference.

Industrial Applicability

In accordance with the battery connection plate according to the invention, a surplus length section can be extremely readily formed on a signal output wire so that influence to the signal output wire due to deviation of a connection position can be suppressed as much as possible, and thereby a good wiring condition can be maintained. Therefore, it is possible to provide a good battery connection plate to be attached to a battery which is mounted on a vehicle such as an electric vehicle, a hybrid car or the like.

Description of Reference Numerals and Signs

10 base plate section
    11 battery connection plate
    12 battery assembly
    13 battery
    14 terminal
    20 bus bar
    31 wiring member attachment section 32 signal output wire
32a surplus length section
33a, 33b, 33c signal wire housing groove (wiring space)
36a, 36b, 36c, 36d window section
43a, 43b, 43c, 43d boss
E assembling finish end
S assembling start end

The invention claimed is:

1. A battery connection plate, comprising:
a base plate section having a plurality of bus bars thereon, the base plate section being configured to attach to a battery assembly containing a stacked plurality of batteries so that the bus bars are connected to terminals on the batteries,
wherein the base plate section includes:
a wiring member attachment section to which a plurality of signal output wires connected to the bus bars are wired, and
window sections formed on wiring paths of the signal output wires at the wiring member attachment section, said window sections having through holes in the base plate section, and
wherein each of the signal output wires has a surplus length section having a curved shape, and the surplus length sections of the signal output wires are arranged in the corresponding window sections respectively.

2. The battery connection plate according to claim 1, wherein the wiring member attachment section has a wiring space for the signal output wires to be wired from an end portion of an assembling start end of the batteries to a connection position with the bus bars;
wherein a region of the wiring space is gradually reduced in accordance with a decrease of the number of the signal output wires toward an assembling finish end of the batteries; and
wherein each of the window sections is formed in a range including a region where the signal output wires are not wired for the wiring space is gradually reduced toward the assembling finish end so that the sizes of the window sections are gradually increased.

3. The battery connection plate according to claim 1, further comprising a plurality of bosses respectively attached to said window sections and configured to be removed therefrom, wherein the signal output wires are respectively wound at least partially around said bosses when said bosses are attached to said window sections.

4. The battery connection plate according to claim 3, wherein the signal output wires are wired so as to be completely coiled around the bosses when the bosses are attached to the window sections.

5. The battery connection plate according to claim 1, wherein the signal output wires are extended in a main wire path and are branched to a branch wire path, the surplus length section is arranged between the main wire path and the branch wire path, and an extension direction of the main wire path is parallel with an extension direction of the branch wire path.

* * * * *